United States Patent [19]
Williams et al.

[11] 3,750,459
[45] Aug. 7, 1973

[54] HYDRO-DYNAMIC TESTING APPARATUS

[75] Inventors: Robert G. Williams, Lawrence W. Howard, Richard J. Thompson, Johnny L. Prater, Steven P. Ryder, all of Huntsville, Ala.

[73] Assignee: The United States of America as represented by the Secretary of the Army, Washington, D.C.

[22] Filed: July 14, 1972

[21] Appl. No.: 271,955

[52] U.S. Cl. .................... 73/49.4, 73/37, 73/119 R, 73/432 SD
[51] Int. Cl. ............................................ G01m 3/02
[58] Field of Search ...................... 73/49.4, 432 SD, 73/12, 37

[56] References Cited
UNITED STATES PATENTS
2,743,604  5/1956  Stein et al. ............................ 73/49.4
3,044,289  7/1962  Fleischhauer .................... 73/49.4 X
3,085,422  4/1963  Monroe et al. ...................... 73/37 X
3,377,841  4/1968  Neal ........................................ 73/37

Primary Examiner—Richard C. Queisser
Assistant Examiner—Joseph W. Roskos
Attorney—Harry M. Saragovitz, Edward J. Kelly et al.

[57] ABSTRACT

An apparatus for hydro-dynamically testing missile motor cases under simulated flight conditions. The apparatus provides means for mounting the motor case and produces the resultant loads equivalent to reaction loads that a case would encounter in flight. Water under low pressure is induced inside of the motor case and when combined with a high pressure piston acting on the water produces two of the simulated resultant loads. Water under low pressure in a separate cavity combined with high pressure from the same piston produces the third simulated resultant load.

5 Claims, 1 Drawing Figure

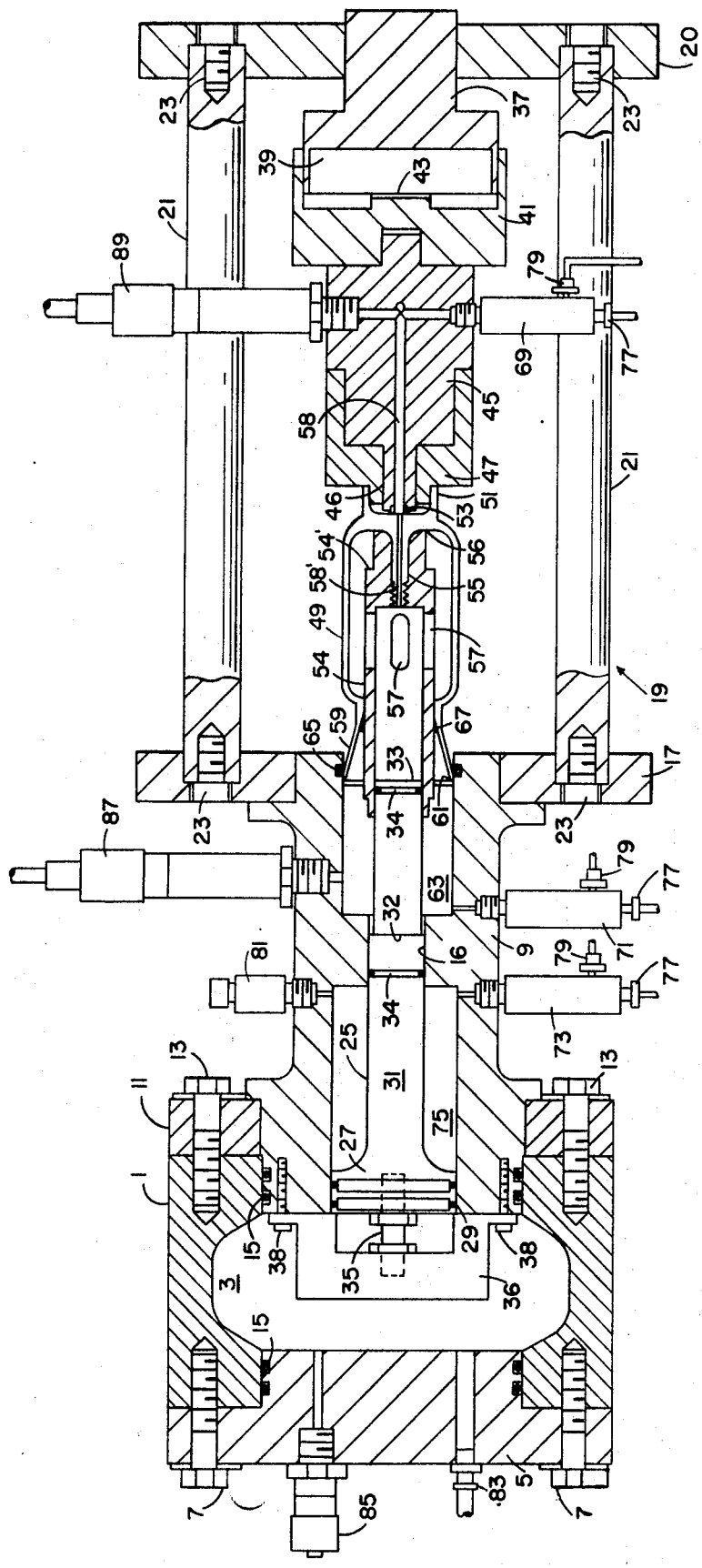

HYDRO-DYNAMIC TESTING APPARATUS

BACKGROUND OF THE INVENTION

This invention relates to the field of specimen testing under pressure. Current designs of some missile motors are such that the loads experienced during flight conditions are utilized to balance against one another, to reduce the resultant loads which the missile structure must carry. All prior testing apparatus are limited to static testing of motor cases by hydraulic means.

SUMMARY OF THE INVENTION

The present invention has provided an apparatus for dynamically testing missile motor cases under simulated flight conditions. The apparatus provides means for mounting and pressurizing the motor case. After air pressure has built up in a chamber a piston is released for movement within the case. The resulting pressures induced by the piston apply the simulated resultant loads within the case until the case ruptures.

This invention may be better understood from the following detailed description taken in conjunction with the accompanying drawing.

BRIEF DESCRIPTION OF THE DRAWING

The single FIGURE shown is a sectional view of the apparatus.

DESCRIPTION OF THE PREFERRED EMBODIMENT

Reference numeral 1 indicates a housing with a pressure chamber 3 therein. This chamber is provided with a cover plate 5 connected to the housing by bolts 7. A cylinder 9, having one end disposed for cooperation with the chamber, is threadably connected to a seal plate 11 that supports the cylinder on the housing by bolts 13. Both the plate and the cylinder are provided with O-rings 15 to prevent pressure leakage from the chamber. The interior of the cylinder includes two cavities, to be described later, separated by a piston support flange 16. The other end of the cylinder is connected to a plate 17 that is part of a support structure 19. This support structure includes plates 17, 20 and rods 21 all connected together by bolts 23 for supporting elements of the testing apparatus.

A piston generally indicated as 25 includes a piston head 27 provided with O-rings 29. The head is connected to a piston shaft 31 that is uniform in diameter up to a stepped portion 32. At this point the diameter of shaft 31 is reduced to a second uniform diameter that extends to a piston face 33. The piston shaft is provided with O-rings 34 to prevent leakage. A breakable trigger 35 is screwed into piston head 27 and to a trigger plate 36 which bridges the piston head and is connected to the cylinder by means 38. The bridge allows application of chamber pressure to the piston head while providing a support for the trigger to hold the piston until release. Different diameter holes can be drilled through the length of the trigger to thereby change its cross sectional area thus providing a means of varying the initiating pressure.

Mounted in plate 20 is a cup 37 that houses a load cell 39. A thrust guide 41 telescopically encloses the cup 37 and loads the cell at point 43. One end of a thrust block 45 engages the guide 41 while the other end is connected at 46 to a pole piece adapter 47. A test missile motor case 49 having a pole piece 51 is connected to the adapter and a washer 53 is located therebetween. Inside of case 49 is a piston guiding means 54 that is screw connected to a pole piece stud 55 and engages the case at 56 and extends rearwardly toward pressure chamber 3. The piston shaft end is guided for movement in the rearward portion of guide 54. Openings 57 provides communication between the interior of case 49 and conduit 58 through conduit extension 58'. The nozzle end 59 of motor case 49 abuts against a ring 61 which is located in nozzle pressure cavity 63 in cylinder 9. The nozzle is closed by seals 65 and 67 to prevent pressure loss.

Three similar valves 69, 71 and 73 are respectively connected to the thrust block 45 for communication with conduit 58, the nozzle cavity 63 and the piston head cavity 75. Each valve has a vacuum inlet 77 and a water inlet 79. The piston head cavity is also provided with an air valve 81 while pressure chamber 3 is provided with an air inlet 83.

Test date is taken at several locations on the apparatus by transducers. Pressure of the pressure chamber is sensed by a transducer 85. Pressure in the nozzle cavity is sensed by a transducer 87 and motor chamber pressure is sensed by a transducer 89.

To simulate missile flight conditions the testing apparatus must supply three loads to a motor case being tested. The apparatus must apply a resultant load to the pole piece 51 equivalent to the set back load that a warhead would impose on the pole piece. This load is supplied when the motor case interior is air evacuated and filled with water at a low pressure of 40 psi. Further pressure is generated when the piston moves and piston face 33 acts on the water in the motor case. A second simulated resultant load must be applied by the apparatus at the pole piece stud 55 equivalent to the inertial load of the stud and motor grain support. This resultant load is produced by the pressure acting on shoulder area 54' of the piston guide. The third simulated resultant load the apparatus must produce equivalent to the inertial load on the motor nozzle, due to the mass of the nozzle and attached fins, the thrust on the nozzle exit cone and the pressure in the case. This simulated resultant load is produced by the piston stepped portion 32 acting on the water under 40 psi in nozzle cavity 63. The load acts on the projected nozzle area and moves the motor case a small distance against the load cell without the end 59 disengaging the cylinder. The operation of the device is as follows: the piston guide 54 is assembled inside a motor case by connecting it to pole piece 55. This assembly is placed in the test apparatus with nozzle 59 fitting into the bottom of the cylinder to abut ring 61 and is sealed by O-ring 65. The forward end of the case is connected to the adapter 47. Next the piston 25 is inserted into the cylinder with the forward end fitting into the piston guide. The trigger is connected to the piston and plate 36.

At this point a vacuum line is attached at 77 to the thrust block valve 69 and the motor case chamber is evacuated. When the air has been removed from the chamber, the valve is closed, the vacuum line is removed and a water line is attached at 79. The valve is then opened and water fills the chamber. This water is under a pressure of about 40 psi. When the chamber is full the valve is closed and the water line is removed.

This same procedure of evacuation and filling is repeated for the nozzle cavity 63 using cylinder valve 71.

When evacuation and fill procedure of the nozzle and motor cavity is complete, the trigger plate is removed and the piston is checked by pushing on the piston face. A fire piston indicates a good evacuation, a spongy piston indicates air in one or both of the chambers. If air is present in either of the cavities then that cavity must be repurged. It is necessary to remove all of the air from the nozzle and motor cavities because the air will compress during the test to the extent that the piston will reach its maximum stroke before the test pressure can be attained. If the purge is good, the trigger plate is replaced and secured.

Next the piston head cavity 75 is evacuated through cylinder valve 73 and a measured amount of water (230 cc) is placed back in the cavity. In addition to this water, air at a pressure of 400 psi is placed in the cavity through air valve 81. This combination of air and water serves as the braking device for the piston to keep the piston from being destroyed during the test. The amount of water mentioned above limits the piston travel to a maximum of 2¾ inches.

When the piston head cavity is ready the cover plate is placed on the reservoir and bolted in place. At this point the actual test is ready to begin.

High pressure air is supplied to the pressure chamber 3 through air line 83 pressurizing the chamber until the trigger fails. Failing of the trigger releases the piston and the piston drives down the cylinder. As this occurs, the pressure acting on the face 33 of the piston and on the pole piece supplies a resultant force equivalent to the setback load of the warhead and pole piece counterbalanced by motor pressure. Also, a load is applied to the pole piece stud equivalent to that of the inertia of the grain support by the pressure acting at point 56. While this is occurring the entire motor case is being pressurized. As the step 32 in the piston moves into the nozzle cavity the pressure is raised to the value necessary to produce the resultant loads and pressures occurring in the nozzle. When the motor case ruptures the piston continues to travel downward until it is stopped by the air cushion and water brake.

This whole operation from trigger release to motor case failure occurs in approximately 1-2 milliseconds.

We claim:

1. An apparatus for testing missile motor cases under simulated flight conditions comprising: a pressure chamber; a cylinder having one end connected to said chamber; a piston disposed in said cylinder; trigger means for retaining movement of said piston; said cylinder having an opposite end including a pressure cavity for mounting the nozzle end of said motor case; means for guiding said piston in said motor case; a thrust block for mounting the forward end of said motor case; means for evacuating air from said motor case and supplying water under pressure thereto; a shoulder on said piston guiding means for producing a simulated resultant load on said motor case; an inlet on said chamber for supplying air under pressure in said chamber for releasing said trigger means and moving said piston in said guiding means to generate a high pressure load in said motor case, and a load cell connected with said thrust block for measuring the load applied to the motor case.

2. An apparatus as set forth in claim 1 wherein said pressure cavity is provided with means for evacuating air therefrom and for supplying water under pressure thereto.

3. An apparatus as set forth in claim 2 wherein said piston is provided with a stepped portion for generating a high pressure in said pressure cavity when said piston is caused to move.

4. An apparatus as set forth in claim 3 wherein said trigger means includes a plate connected to said cylinder and a trigger having one end connected to said plate and its opposite end connected to said piston to prevent movement of said piston.

5. An apparatus as set forth in claim 4 wherein said cylinder has a piston head cavity provided with means for evacuating air therefrom and for supplying water under pressure thereto to provide a braking device for said piston.

* * * * *